United States Patent

Loberg et al.

[11] Patent Number: 4,721,405
[45] Date of Patent: Jan. 26, 1988

[54] TENSIONED COUPLING ASSEMBLY

[75] Inventors: Grant M. Loberg, Los Angeles; Rodney R. Gross, Pacific Palisades, both of Calif.

[73] Assignee: Rockwell International Corporation, El Segundo, Calif.

[21] Appl. No.: 917,338

[22] Filed: Oct. 9, 1986

[51] Int. Cl.[4] .................................. F16D 9/00
[52] U.S. Cl. ............................ 403/2; 403/273; 403/300; 403/343
[58] Field of Search ............... 403/2, 28, 300, 11, 403/41, 343, 320, 273, 30, 179, 266, 314, 310; 285/3, 4, 23

[56] References Cited

U.S. PATENT DOCUMENTS

| | | | |
|---|---|---|---|
| 1,969,431 | 8/1934 | Skinner | 403/343 |
| 1,978,229 | 10/1934 | Sass et al. | 403/343 |
| 2,889,162 | 6/1959 | Norris | 403/2 |
| 3,002,775 | 10/1961 | Mueller et al. | 403/2 |
| 3,524,665 | 8/1970 | Hohn et al. | 403/273 |
| 3,682,440 | 8/1972 | Walker | 403/343 |
| 4,052,826 | 10/1977 | Chisholm | 403/2 |
| 4,294,559 | 10/1981 | Schutzler | 403/28 |
| 4,299,018 | 11/1981 | Bickerstaff et al. | 403/179 X |
| 4,380,349 | 4/1983 | Bray | 285/417 |
| 4,469,465 | 9/1984 | Andrus | 403/282 |
| 4,543,011 | 9/1985 | Lindenthal | 403/273 X |
| 4,575,274 | 3/1986 | Hayward | 403/2 |

Primary Examiner—Randolph A. Reese
Assistant Examiner—Peter M. Cuomo
Attorney, Agent, or Firm—H. Fredrick Hamann; Harry B. Field; David C. Faulkner

[57] ABSTRACT

A selectively preloaded coupling assembly 10 for connecting tubular members includes a tensioned annular member 12 including opposing coupling means 14, an annular recess 22 formed within the tensioned member and a tension maintaining annular member 26 seated within the annular recess.

11 Claims, 3 Drawing Figures

TENSIONED COUPLING ASSEMBLY

BACKGROUND OF THE INVENTION

1. Technical Field

This invention relates to coupling devices for use in connection with tubular members.

More particularly, the present invention relates to a selectively, preloaded coupling assembly for connecting tubular members.

In a further aspect, the instant invention concerns a preloaded or tensioned coupling assembly and a method for preloading tension into the coupling assembly.

2. Background Art

Coupling devices or connector assemblies for joining together tubular members such as pipes, cables and the like are as varied in design as they are numerous.

In U.S. Pat. No. 4,523,872 there is described a torque tube employing end members interconnected by a tubular member. The end members are provided with a male extension having radially spaced, axially extending grooves. The ends of the tubular member are positioned over the male end member extensions and the tube walls are conformed to the end member and grooves electromagnetically so that the tube walls are recessed into the grooves.

U.S. Pat. No. 4,380,349 discloses a connector for plugs comprising an outer member, an inner member and a resilient member. A pair of recesses are provided in the inner member for engagement with latches provided on plugs to be inserted into the connector. The resilient member resists longitudinal movement of the inner member relative to the outer member.

However, applicants are unaware of any connecting assembly that is constructed in such a fashion as to allow the selective pretensioning of the device prior to utilization. In certain environments, such as under water or in outer space, a pretensioned connecting or coupling assembly could be utilized to construct maneuverable or stationary truss structures. Such devices would eliminate the adverse torsional forces normally encountered during structure construction in such environments, i.e. action-reaction torsional forces law.

It is therefore an object of the instant invention to provide an improved coupling assembly for connecting tubular members and the like.

Another object of the present invention is to disclose a preferred method for selectively preloading tension into a coupling assembly.

Yet another object of this invention is to provide an improved connector assembly of unencumbered design, having relatively few uncomplicated components.

SUMMARY OF THE INVENTION

Briefly, to achieve the desired objects of the coupling assembly of the present invention in accordance with a preferred embodiment thereof, provided are means for selectively tensioning a member having opposing coupling means. More specifically, the invention includes means for applying a selected degree of tension to a coupling assembly and means for maintaining a portion of the coupling assembly in the pretensioned state prior to utilization.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings, in which.

DETAILED DESCRIPTION OF THE INVENTION

Figure 1:
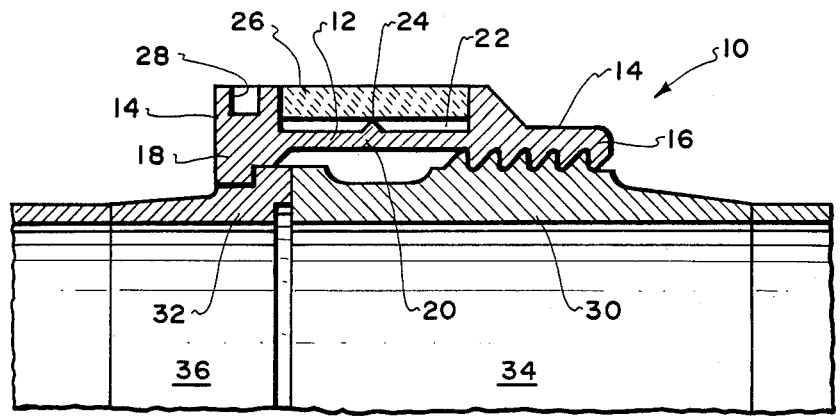
FIG. 1 is a vertical sectional view of an externally mounted coupling assembly embodying the teachings of the instant invention.

Referring to the drawings in which like reference characters indicate corresponding elements throughout the several views, attention is first directed to FIG. 1 which illustrates an embodiment of the externally mounted unitary coupling assembly 10 of the instant invention having a tensioned member 12 including opposing coupling means 14. In this embodiment the opposing coupling means comprise a threaded segment 16 and a shoulder segment 18. The threaded segment 16 and the shoulder segment 18 are connected together by a thinner central segment 20 which forms an annular recess 22. Annular recess 22 is also provided with a knife edge 24. A tension maintaining annular member 26, comprised of at least two annular segments, is seated within the annular recess 22 for maintaining the coupling assembly in the pretensioned state prior to utilization. The shoulder segment is also provided with a wrenching slot 28. The slot 28 is of assistance in positioning and mating the coupling assembly and the tubular members as more clearly detailed below.

As shown in FIG. 1 the threaded segment and the shoulder segment of the coupling assembly are matingly receivable with a corresponding tubular member threaded segment 30 and a shoulder segment 32 of the tubular members 34 and 36 which are joined by the coupling assembly 10.

Figure 2:
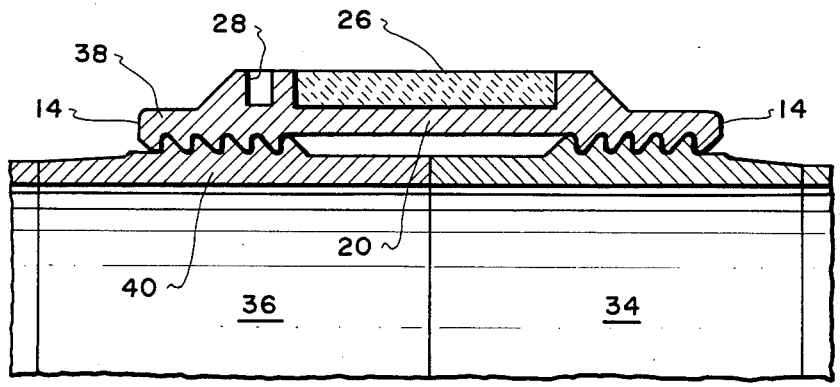
FIG. 2 is another sectional view of the coupling assembly of the instant invention wherein the tubular members and opposing coupling means of the coupling assembly are provided with intermeshing threaded segments.

Referring to FIG. 2, the preferred externally mounted coupling assembly embodiment illustrated therein is substantially the same as that shown in FIG. 1 with the exception of corresponding threaded segments 38 and 40 which replace the coupling assembly shoulder segment 18 and the tubular member shoulder segment 32, respectively.

Figure 3:
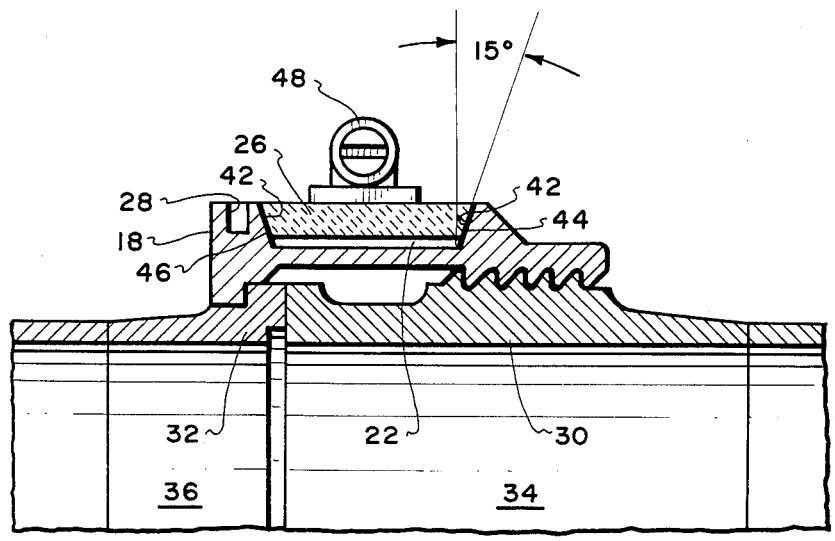
FIG. 3 is still another sectional view of yet another embodiment of the instant invention.

The embodiment of the coupling assembly of the instant invention detailed in FIG. 3 is very similar to the embodiments of FIG. 1, i.e. the recess floor surface is the same but the side shoulders adjacent the opposing coupling means and formed at right angles thereto are replaced with beveled shoulders 42 as indicated by the lines and arrows. In like fashion, the tension maintaining annular member 26 is seated within the annular recess 22. A retention aid 48 such as a screw tightened clamp is utilized to maintain annular member 26 within the annular recess 22 until the coupling assembly is mated to the tubular members and the coupling assembly functioned to join the tubular halves, such as pipes, electrical conduits, truss structures and the like.

Manufacture of the coupling assembly of the instant invention requires the selective preloading of tension thereinto. The method utilized to accomplish the application of a selective or predetermined degree of tension to the coupling assembly comprises applying pretensioning means to the annular coupling assembly. This may be accomplished by mechanically or hydraulically stretching the central segment 20. Once the central segment has been pretensioned, the tension maintaining annular member is seated within the annular recess while maintaining the pretensioning mechanical or hydraulic means. A temperature difference between the main body of the coupling assembly and the tension maintaining annular member may also be used to ease installation of the annular member or to achieve axial stretching of the coupling assembly annular member. After the annular member is seated within the annular recess, the pretensioning means is removed providing a set or "stressed" coupling assembly which may be transported to the location of its end usage.

When utilized, the coupling assembly may be lightly snugged up by hand such as by using the wrenching slot 28 and a spanner wrench (not shown). It is only necessary to apply sufficient load (tightening), at this time, to obtain mating contact between the coupling assembly and the tubular members.

The tension maintaining annular member may then be removed by one of the following means or combination thereof:

(a) With the utilization of a frangible material such as a ceramic for the tension maintaining annular member 20, the member may be broken by applying sufficient pressure against the member (as by rapping) to force the member against a knife edge 24 provided in the annular recess as shown in FIG. 1.

(b) A non-frangible metallic material (steel, copper, etc.) may be utilized to construct the tension maintaining annular member, such as depicted in FIG. 3. In this case, the side shoulders of the annular recess and the opposing sides surfaces 44, 46 of the tension maintaining annular member are provided with a slight draft angle to facilitate removal of the tension maintaining annular member.

The removal of the annular member from the coupling assembly allows energy stored therein at the time of manufacture to be translated into joint preload at the time of installation thus requiring little or no installation torque.

Various changes and modifications to the embodiments herein shown and described will readily occur to those skilled in the art. For example, some applications may require additional travel when the coupling assembly is actuated. This requirement may be accommodated by replacing the thinner central segment 20 with a low profile bellows section.

To the extent that such modifications and variations do not depart from the spirit of the invention, they are intended to be included within the scope thereof as governed by the following claims.

What is claimed is:

1. An externally mounted, pre-tensioned coupling assembly for connecting tubular members comprising:
   (a) a tensioned annular member including opposing coupling means;
   (b) said tensioned annular member having a central segment portion intermediate the coupling means and being thinner than the coupling means;
   (c) an annular recess formed by said central segment portion and said opposing coupling means of said tensioned annular member; and
   (d) a removable tension-maintaining annular member seated within the annular recess.

2. A coupling assembly according to claim 1 in which the opposing coupling means comprise tensioned thickened, surface threaded segments at opposing ends of the coupling assembly.

3. A coupling assembly according to claim 1 in which the annular recess has beveled shoulders adjacent the opposing coupling means.

4. A coupling assembly according to claim 1 in which the annular recess includes a bottom surface and side shoulders adjacent the opposing coupling means formed at right angles thereto.

5. A coupling assembly according to claim 1 in which the annular recess further includes a knife edge.

6. A coupling assembly according to claim 1 in which the tension-maintaining annular-shaped member is non-frangible.

7. A coupling assembly according to claim 1 in which the tension-maintaining annular-shaped member is frangible.

8. A method for pre-loading tension into an externally mounted coupling assembly comprising an annular member including opposing coupling means, said annular member having a central segment portion intermediate the coupling means and being thinner than the coupling means, and an annular recess formed by said central segment portion and opposing coupling means of said annular member, and a removable tension-maintaining annular-shaped member seated within the annular recess, the method comprising:
   (a) applying pre-tensioning means to the annular member to pre-tension same;
   (b) seating the removable tension-maintaining annular member within the annular recess while maintaining tension on the annular member; and
   (c) removing the pre-tensioning means thereby providing a pre-tensioned annular member.

9. The method of claim 8 in which the pre-tensioning means comprises mechanical forces axially stretching the annular member.

10. The method of claim 8 in which the pre-tensioning means comprises a temperature differential within the annular member to achieve stretching of the annular member.

11. Tubular members joined together by an externally mounted pre-tensioned coupling assembly comprising a tensioned annular member including opposing coupling means, said annular member having a central segment portion intermediate the coupling means and being thinner than the coupling means, an annular recess formed by said central segment portion and said opposing coupling means of said tensioned annular member, and a removable tension-maintaining annular-shaped member seated within the annular recess, tension for joining the tubular members provided by applying pre-tensioning means to the annular member to pre-tension same, seating the removable tension-maintaining annular member within the annular recess while maintaining tension on the annular member, removing the pre-tensioning means thereby providing a pre-tensioned annular member, mating the tubular members to the opposing coupling means of the tensioned annular member, and removing the tension-maintaining annular member.

* * * * *